US010812859B2

(12) United States Patent
Eyer

(10) Patent No.: US 10,812,859 B2
(45) **Date of Patent: *Oct. 20, 2020**

(54) SERVICE USAGE REPORTING DATA TRANSPORT

(71) Applicant: Saturn Licensing LLC, New York, NY (US)

(72) Inventor: Mark Eyer, Woodinville, WA (US)

(73) Assignee: Saturn Licensing LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/640,651

(22) Filed: Jul. 3, 2017

(65) Prior Publication Data

US 2018/0063584 A1 Mar. 1, 2018

Related U.S. Application Data

(63) Continuation of application No. 14/458,310, filed on Aug. 13, 2014, now Pat. No. 9,699,505, which is a (Continued)

(51) Int. Cl.

*H04N 7/16* (2011.01)
*H04N 21/442* (2011.01)

(Continued)

(52) U.S. Cl.

CPC ..... *H04N 21/44222* (2013.01); *H04N 7/0882* (2013.01); *H04N 21/00* (2013.01);

(Continued)

(58) Field of Classification Search

CPC combination set(s) only.
See application file for complete search history.

(56) References Cited

U.S. PATENT DOCUMENTS 6,704,929 B1 3/2004 Ozer et al.
8,429,516 B1 * 4/2013 Riggs .................. G06F 21/6254 715/201

(Continued)

FOREIGN PATENT DOCUMENTS

KR 20080003961 A 1/2008

OTHER PUBLICATIONS

Office Action dated Jan. 14, 2016 in Chinese Patent Application No. 201380008140.7.

(Continued)

*Primary Examiner* — Mulugeta Mengesha
(74) *Attorney, Agent, or Firm* — Oblon, McClelland, Maier & Neustadt, L.L.P.

(57) ABSTRACT

A reception apparatus, including circuitry configured to receive a broadcast stream including audio/video content and a uniform resource identifier (URI). The circuitry is configured to determine whether a command identifier associated with the URI indicates the URI is a location of a server to which service usage information is to be sent. The circuitry is configured to, when the command identifier indicates the URI is the location of the server to which the service usage information is to be sent, associate the URI with the service provider. The circuitry is configured to provide the service usage information to the server according to the associated URI.

20 Claims, 18 Drawing Sheets

Related U.S. Application Data continuation of application No. 13/800,734, filed on Mar. 13, 2013, now Pat. No. 8,839,338.

(60) Provisional application No. 61/616,850, filed on Mar. 28, 2012.

(51) Int. Cl.

| | |
|---|---|
| ***H04N 7/088*** | (2006.01) |
| ***H04N 21/435*** | (2011.01) |
| ***H04N 21/488*** | (2011.01) |
| ***H04N 21/8352*** | (2011.01) |
| ***H04N 21/00*** | (2011.01) |

(52) U.S. Cl.

CPC ....... *H04N 21/435* (2013.01); *H04N 21/4884* (2013.01); *H04N 21/8352* (2013.01)

(56) References Cited

U.S. PATENT DOCUMENTS

| | | | |
|---|---|---|---|
| 8,599,242 | B2 | 12/2013 | Suh et al. |
| 2005/0060758 | A1 | 3/2005 | Park |
| 2009/0052863 | A1 | 2/2009 | Parmar et al. |
| 2010/0157025 | A1 | 6/2010 | Suh et al. |
| 2010/0162333 | A1* | 6/2010 | Sylvain .............. H04N 7/17318 725/109 |
| 2010/0309387 | A1* | 12/2010 | Eyer .................... H04N 21/235 348/731 |
| 2011/0128443 | A1 | 6/2011 | Blanchard et al. |
| 2011/0216163 | A1 | 9/2011 | Dougherty et al. |
| 2011/0221863 | A1 | 9/2011 | Eyer |
| 2011/0258659 | A1 | 10/2011 | Carney et al. |
| 2011/0279644 | A1 | 11/2011 | Suh et al. |
| 2012/0063508 | A1* | 3/2012 | Hattori ............. H04N 21/23614 375/240.01 |
| 2013/0010200 | A1 | 1/2013 | Kim et al. |
| 2013/0027514 | A1 | 1/2013 | Cho et al. |

OTHER PUBLICATIONS

International Search Report and Written Opinion dated Jun. 6, 2013, in International Application No. PCT/US13/33282.

* cited by examiner

FIG. 2
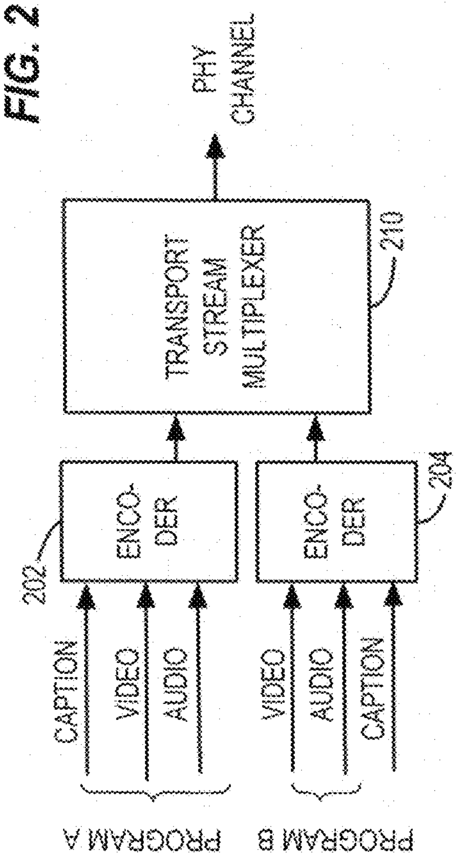
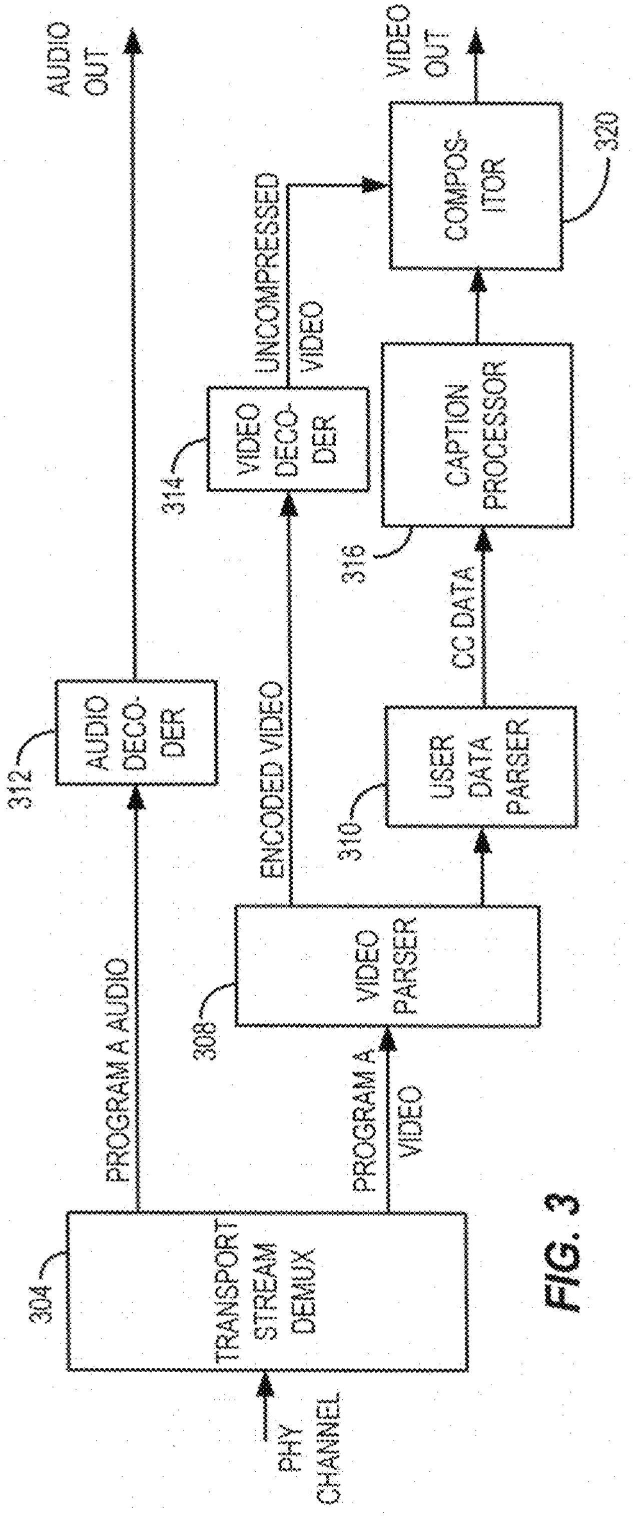
FIG. 3

Variable Length SURSLocator Command

| b7 | b6 | b5 | b4 | b3 | b2 | b1 | b0 |
|---|---|---|---|---|---|---|---|
| 0 | 0 | 0 | 1 | 0 | 0 | 0 | 0 |
| 1 | 0 | 0 | 1 | 1 | 0 | 0 | 1 |
| t1 | t0 | 0 | L4 | L3 | L2 | L1 | L0 |
| SURS_locator() | | | | | | | |

- EXT1
- 0x99
- type
- length

FIG. 8A

Name: SURSLocator – Service Usage Reporting Locator

Format: Variable-length

Command Coding:

| $b_7$ | $b_6$ | $b_5$ | $b_4$ | $b_3$ | $b_2$ | $b_1$ | $b_0$ | |
|---|---|---|---|---|---|---|---|---|
| 0 | 0 | 0 | 1 | 0 | 0 | 0 | 0 | EXT1 |
| 1 | 0 | 0 | 1 | 1 | 0 | 0 | 1 | 0x99 |
| 1 | 1 | 0 | $L_4$ | $L_3$ | $L_2$ | $L_1$ | $L_0$ | |
| **SURS_locator()** | | | | | | | | (variable length) |

Description: the SURSLocator command provides the URL for a broadcaster's service usage reporting function. The SURSLocator command is transported in standard caption Service #6.

Parameters:

- *Length (L)* is an unsigned integer that shall indicate the number of bytes following the header, in the range 11 to 27.

*FIG. 8B*

| | No. of bits | Format | No. of Bytes |
|---|---|---|---|
| SURS_locator() { | | | |
| reserved | 4 | bslbf | 1 |
| locator_type | 4 | uimsbf | |
| for (i=0; k<L-1; k++) { | | | |
| URL_character | 8 | uimsbf | 1 |
| } | | | |
| } | | | |

Table - SURS_Locator() Data Syntax

*FIG. 8C*

BroadcasterTSID

| b7 | b6 | b5 | b4 | b3 | b2 | b1 | b0 |
|---|---|---|---|---|---|---|---|
| 0 | 0 | 0 | 1 | 1 | 0 | 0 | 1 |
| ts15 | ts14 | ts13 | ts12 | ts11 | ts10 | ts9 | ts8 |
| ts7 | ts6 | ts5 | ts4 | ts3 | ts2 | ts1 | ts0 |

- 0x19
- TSID

FIG. 8D

Name: BroadcasterTSID – Broadcaster Transport Stream ID

Format: Fixed-length, three bytes

Command Coding:

| $b_7$ | $b_6$ | $b_5$ | $b_4$ | $b_3$ | $b_2$ | $b_1$ | $b_0$ | |
|---|---|---|---|---|---|---|---|---|
| 0 | 0 | 0 | 1 | 1 | 0 | 0 | 1 | 0x19 |
| $ts_{15}$ | $ts_{14}$ | $ts_{13}$ | $ts_{12}$ | $ts_{11}$ | $ts_{10}$ | $ts_9$ | $ts_8$ | |
| $ts_7$ | $ts_6$ | $ts_5$ | $ts_4$ | $ts_3$ | $ts_2$ | $ts_1$ | $ts_0$ | |

Description: The BroadcasterTSID command signals a broadcaster's assigned Transport Stream ID. The BroadcasterTSID command is transported in standard caption Service #6.

Parameters:

- *ts* is an unsigned 16-bit integer that shall indicate the TSID of the broadcaster originating the command.

*FIG. 8E*

Broadcaster Major Channel

| b7 | b6 | b5 | b4 | b3 | b2 | b1 | b0 |
|---|---|---|---|---|---|---|---|
| 0 | 0 | 0 | 1 | 1 | 0 | 1 | 0 |
| r | r | r | r | mc11 | mc10 | mc9 | mc8 |
| mc7 | mc6 | mc5 | mc4 | mc3 | mc2 | mc1 | mc0 |

- 0x1A
- reserved
- channel

FIG. 8F

Name: BroadcasterMC1 – Broadcaster Major Channel

Format: Fixed-length, three bytes

Command Coding:

| $b_7$ | $b_6$ | $b_5$ | $b_4$ | $b_3$ | $b_2$ | $b_1$ | $b_0$ | |
|---|---|---|---|---|---|---|---|---|
| 0 | 0 | 0 | 1 | 1 | 0 | 1 | 0 | 0x1A |
| r | r | r | r | $mc_{11}$ | $mc_{10}$ | $mc_9$ | $mc_8$ | |
| $mc_7$ | $mc_6$ | $mc_5$ | $mc_4$ | $mc_3$ | $mc_2$ | $mc_1$ | $mc_0$ | |

Description: The BroadcasterMC1 command signals a broadcaster's Major Channel number. The BroadcasterMC1 command is transported in standard caption Service #6.

Parameters:

- *mc* is an unsigned 16-bit integer that shall indicate the Major Channel number of the broadcaster originating the command.

*FIG. 8G*

Broadcaster Minor Channel

| b7 | b6 | b5 | b4 | b3 | b2 | b1 | b0 |
|---|---|---|---|---|---|---|---|
| 0 | 0 | 0 | 1 | 1 | 0 | 1 | 1 |
| r | r | r | r | mc11 | mc10 | mc9 | mc8 |
| mc7 | mc6 | mc5 | mc4 | mc3 | mc2 | mc1 | mc0 |

- 0x1B
- reserved
- channel

*FIG. 8H*

Name: BroadcasterMC2 – Broadcaster Minor Channel

Format: Fixed-length, three bytes

Command Coding:

| $b_7$ | $b_6$ | $b_5$ | $b_4$ | $b_3$ | $b_2$ | $b_1$ | $b_0$ | |
|---|---|---|---|---|---|---|---|---|
| 0 | 0 | 0 | 1 | 1 | 0 | 1 | 1 | 0x1B |
| r | r | r | r | $mc_{11}$ | $mc_{10}$ | $mc_9$ | $mc_8$ | |
| $mc_7$ | $mc_6$ | $mc_5$ | $mc_4$ | $mc_3$ | $mc_2$ | $mc_1$ | $mc_0$ | |

Description: The BroadcasterMC2 command signals a broadcaster's Minor Channel number. The BroadcasterMC2 command is transported in standard caption Service #6.

Parameters:

- *mc* is an unsigned 16-bit integer that shall indicate the Minor Channel number of the broadcaster originating the command.

*FIG. 8I*

SERVICE USAGE REPORTING DATA TRANSPORT

CROSS REFERENCE TO RELATED DOCUMENTS

This application is a continuation of U.S. patent application Ser. No. 14/458,310 filed Aug. 13, 2014, which is a continuation of U.S. patent application Ser. No. 13/800,734, filed Mar. 13, 2013, now patented as U.S. Pat. No. 8,839,338, which is related and claims priority to U.S. Provisional Patent Application No. 61/616,850, filed Mar. 28, 2012, all of which are incorporated herein by reference in their entirety. This application is related to U.S. Provisional Patent Application Nos. 61/613,869 and 61/613,880 filed Mar. 21, 2012 to Mark Eyer; and U.S. Provisional Patent Application No. 61/452,247 filed Mar. 14, 2011 to Mark Eyer. This application is also related to U.S. Provisional patent application 61/415,924 filed Nov. 22, 2010 entitled "Service Linkage to Caption Disparity Data Transport" to Mark Eyer, et al.; and U.S. Provisional Patent Applications No.: 61/415,457 filed Nov. 19, 2010 entitled "Disparity Data Signaling and Transport for 3D Captioning" to Mark Eyer, et al.; 61/346,652 filed May 20, 2010 entitled "Disparity Data Transport" to Mark Eyer, et al.; and 61/313,612 filed Mar. 12, 2010 to Mark Eyer et al, and U.S. Provisional Patent Application No. 61/316,733 filed Mar. 23, 2010 entitled "Extended Command Stream for CEA-708 Captions" to Mark Eyer et al., and U.S. Provisional Patent Application No. 61/378,792 filed Aug. 31, 2010 entitled "Efficient Transport of Frame-by-Frame Change in Captioning Disparity Data" to Mark Eyer; and the application is also related to non-provisional patent application Ser. Nos. 13/022,828, 13/022,817 and 13/022,810 which were each filed on Feb. 8, 2011. Each of the above applications is hereby incorporated by reference in their entirety.

BACKGROUND OF THE INVENTION

Field of the Invention

Embodiments described herein relate generally to a reception apparatus, information providing apparatus, methods, non-transitory computer-readable storage mediums for providing and/or processing reporting service data. More particularly, embodiments of the present application relate generally to reporting service data transported in a standard caption service.

Background

Embodiments of the present disclosure arises out of a need in a full "advanced interactive television" system for a standardized method to enable a broadcaster to gain knowledge of which and how many of its service offerings are being consumed. A number of "roadblocks" are well known to including identification information along with a television broadcast, including the presence of the HDMI interface between a cable or satellite set-top box (STB) and an interactive television (iTV) receiver.

SUMMARY OF THE INVENTION

According to an embodiment of the present disclosure, there is provided a reception apparatus. The reception apparatus includes a receiver, a parser, and a processor. The receiver receives closed caption service data. The closed caption service data includes closed caption data within a first service block having a service number in the range of 1-6, and service usage reporting data within a second service block having a different service number in the range of 1-6. The closed caption data includes closed caption text. The parser parses the service usage reporting data within the second service block having the different service number in the range of 1-6. The processor provides service-usage information to a service-usage reporting server (SURS) based on the service usage reporting data.

According to an embodiment of the present disclosure, there is provided a method of a reception apparatus for processing service usage reporting data. The method includes receiving, by the reception apparatus, closed caption service data. The closed caption service data includes closed caption data within a first service block having a service number in the range of 1-6, and the service usage reporting data within a second service block having a different service number in the range of 1-6. The closed caption data includes closed caption text. The reception apparatus parses service usage reporting data within the second service block having the different service number in the range of 1-6. A processor of the reception apparatus provides service-usage information to a service-usage reporting server (SURS) based on the service usage reporting data.

According to an embodiment of the present disclosure, there is provided a non-transitory computer-readable storage medium storing a program which when executed by a computer causes the computer to perform the method of the reception apparatus described above.

According to an embodiment of the present disclosure, there is provided an information providing apparatus. The information providing apparatus includes a closed caption unit and a communication interface. The closed caption unit generates or receives closed caption service data associated with audio/video content. The communication interface provides the audio/video content and the closed caption service data to a reception apparatus. The closed caption service data includes closed caption data within a first service block having a service number in the range of 1-6, and service usage reporting data within a second service block having a different service number in the range of 1-6. The closed caption data includes closed caption text.

According to an embodiment of the present disclosure, there is provided a method of an information providing apparatus for providing service usage reporting data. The method includes generating or receiving, by the information providing apparatus, closed caption service data associated with audio/video content. The information providing apparatus provides the audio/video content and the closed caption service data to a reception apparatus. The closed caption service data includes closed caption data within a first service block having a service number in the range of 1-6, and the service usage reporting data within a second service block having a different service number in the range of 1-6. The closed caption data includes closed caption text.

According to an embodiment of the present disclosure, there is provided a non-transitory computer-readable storage medium storing a program which when executed by a computer causes the computer to perform the method of the information providing apparatus described above.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 2 is an example information providing apparatus consistent with certain embodiments of the present disclosure.

FIG. 3 is an example reception apparatus consistent with certain embodiments of the present disclosure.

FIGS. 8A-8I are examples of service usage reporting data commands consistent with certain embodiments of the present disclosure.

DETAILED DESCRIPTION

Figure 1:
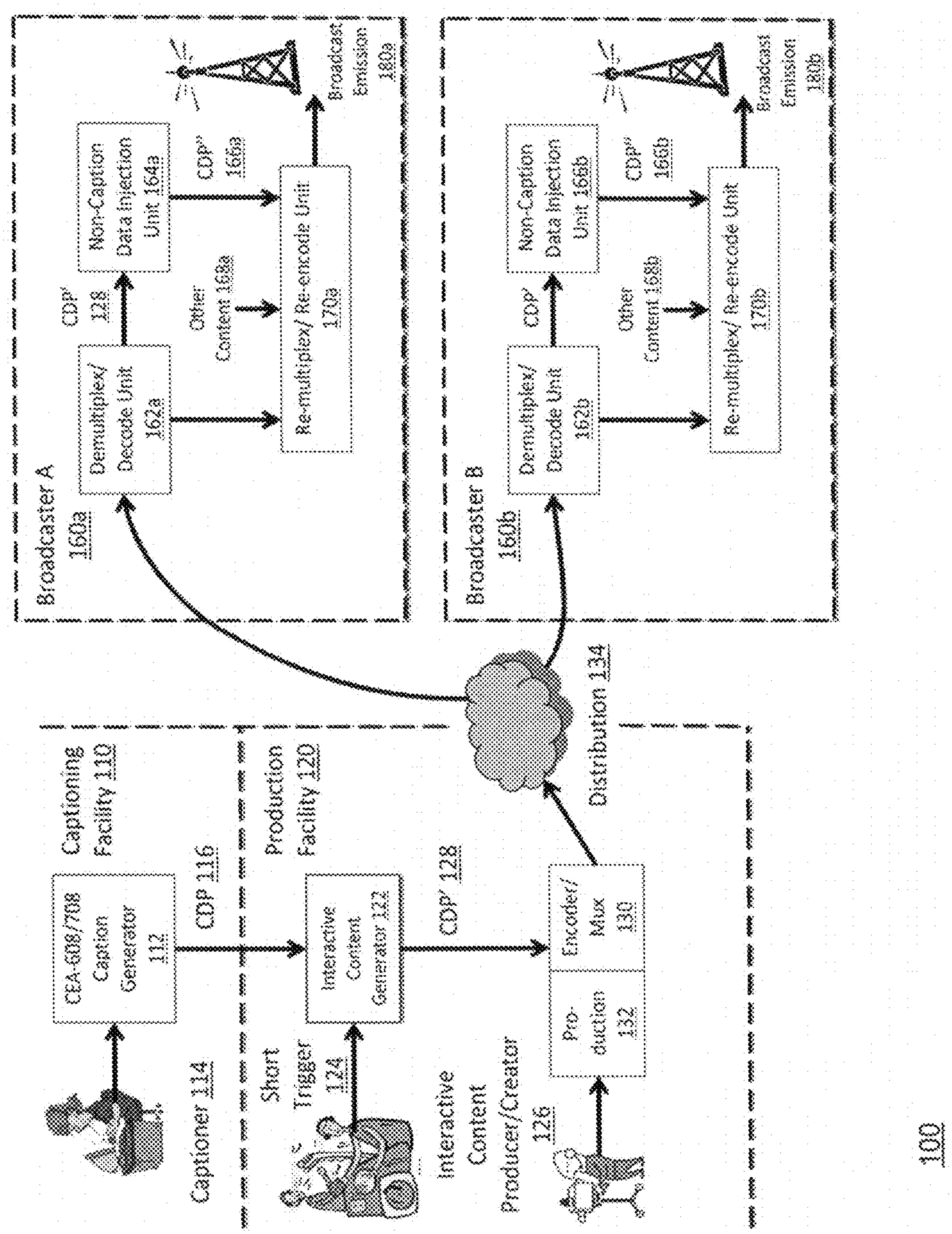
FIG. 1 is an example of a transmission system consistent with certain embodiments of the present disclosure.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

An interactive television system can be implemented using a combination of a "compact trigger" and a number of data tables including a Trigger Parameters Table (TPT) made available via a web-based server. Embodiments of the compact trigger identify the location of the web-based server, and can perform a number of other functions including a) establish the media time (current time within a program segment); b) identify an event, by reference to a TPT, that should be executed now or at a given time into the future; or c) simply provide the location of the Internet-based table(s) for purpose of pre-loading the content.

The compact trigger and TPT method for adding interactive elements to a program segment requires that the receiving device have access to the compact trigger. An automatic content recognition (ACR) system can identify sampled audio/video and return the compact trigger plus media time. Compact triggers can be delivered within the broadcast (or file-based) content as well. As disclosed in U.S. Provisional Application No. 61/613,869, the compact trigger can be carried within the digital closed caption stream, within a CEA-708 variable-length command carried in Service #6.

The method of transport and an iTV receiver's ability to access the compact trigger are important aspects of the system design. The specific considerations at play involve the processing and manipulation steps the content undergoes as it traverses from the point of origin through the distribution chain, ultimately reaching the consumer's iTV receiver. For example, a Multi-channel Video Programming Distributor (MVPD) will typically remove any extraneous Elementary Streams from the multiplex before delivering it to the consumer's home. If the audio and video are delivered in uncompressed format (e.g. via HDMI), all aspects of the multiplex are unavailable. However, the audio and video may be conveyed in compressed form from a consumer electronics device (e.g., a cable operator's set-top box) via Internet Protocol (IP) protocols using Digital Living Network Alliance (DLNA profiles) and methods. In this case, the compressed audio and video packets are delivered intact to the iTV receiver.

Although, the caption data stream does not make it across the current HDMI interface, a "partial" TS can be accessed by means of methods specified by DLNA protocols. In another embodiment, if the HDMI interface is modified to carry the caption data stream, the partial TS can be accessed from the HDMI interface instead of using the DLNA methods.

For example, in some cases, the full MPEG-2 Transport Stream, or a portion of the full broadcast multiplex at least containing the audio and video portions, will be available at the iTV receiver. In such cases, due to reprocessing at the cable/satellite plant, some adjunct data may be stripped out. Accordingly, even if Adjunct data were configured to include service usage reporting data, the service usage reporting data would not necessarily be received by the iTV receiver. Further, examples of data that may not pass through the MVPD's distribution plant include extra descriptors in the PMT and extra Elementary Stream components. However, when at least some portion of the program is delivered in compressed form, the MPEG or AVC compressed video packets will be available. These packets contain the closed caption data stream.

Some examples of cases where compressed video is available are when the receiver accesses the Transport Stream directly from an 8-VSB, QAM or Mobile DTV tuner, or when it has home network access to a cable/satellite/IPTV set-top box that supports DLNA protocols and offers a compressed video stream on the network interface.

The FCC has ruled that, after the end of 2012, digital cable set top boxes in the U.S. must support network interfaces allowing devices on the network to access compressed audio/video for decoding and recording. DLNA protocols are being finalized for this purpose. This method affords a new path for delivery of compressed video including closed captioning and, service usage reporting data.

Embodiments of the present disclosure describe a method for delivery of service usage reporting data such as the identity of a broadcaster's service-usage reporting server (SURS) whereby the URL of the SURS is conveyed within a variable-length command carried in Service #6 of the digital closed captioning stream. In addition, methods are described to signal the identity of the broadcaster originating a program by, for example, means of the broadcaster's Transport Signal ID (TSID) and/or other identification information such as Major/Minor Channel numbers. These are useful for certain applications where the identity of the original broadcaster must be known with certainty.

As noted above, the full "advanced interactive television" system requires a standardized method to enable a broadcaster to gain knowledge of which and how many of its service offerings are being consumed. A method can be standardized for receivers to collect and maintain records of usage events, such as the date and time the user tuned to or away the broadcaster's content, or the date and time the user chose to download or play back a certain item of non-real time (NRT) content offered by that broadcaster. Some embodiments of the usage events and the reporting thereof are described in U.S. Patent Application Publication No. 2011/0243536 filed Jan. 5, 2011 to Mark Eyer, which is incorporated herein by reference in its entirety. The receiver must be able to know the location to where a given set of usage records should be delivered. For example, the receiver must be able to determine, for any given item of content, the identity of the broadcaster as well as the Internet server that will collect the usage information (the location of the SURS).

ACR systems are well-suited to determining the identity of a particular piece of content, but not well suited to identifying exactly within what broadcaster's signal the content was received. Given some other information, such as the receiver's location, better guesses can be made. Even then, in some instances, the same program can be receivable from multiple broadcasting sources. In some locations for example, one receiver can access a program from an NBC affiliate in one nearby city while at the same time being able to access, by tuning to a different channel, the same program from a different NBC affiliate in a different nearby town.

Certain embodiments of the present disclosure provide a method to unambiguously identify the identity of the broadcaster's SURS. The method survives the distribution chain and is usable using a variety of distribution methods. Further, the method addresses problems including:

1. ACR systems have difficulty providing a reliable indication of the identity of the broadcaster who is providing the content being identified.

2. Advanced television receivers need to know where to deliver service usage reports (e.g. Internet location of broadcaster's usage reporting server).

3. Receivers do not always have access to the original complete Transport Stream, so for example the original program-specific information (PSI) and Program and System Information Protocol (PSIP) tables are not accessible or available. The PSIP standard is ATSC A/65. Case in point: the service is received via a cable or satellite distribution system.

4. Injection of the location of the SURS can require development of new data paths in the distribution chain and hence lead to undue complexity in implementation.

Methods for addressing the above-described problems include:

1. Requiring access to the full broadcast Transport Stream (not always possible).

2. Requiring an ACR system to derive the necessary SURS locator (awkward and unreliable).

3. Deliver the SURS locator and identity of the broadcast stream in a convenient way that will be likely to survive the distribution path to the iTV receiver.

Certain embodiments of the present disclosure offer an approach aligned with method "c."

Specifically, in one embodiment, the present disclosure proposes to deliver the URI, or URL, of the SURS in a variable-length CEA-708 advanced captioning command, and transport that command in standard caption Service #6. An example of safely transporting other variable- and fixed-length data in Service #6 is described in for example U.S. Provisional Patent Application No. 61/613,869. The concept of "safely" here refers to the method's compatibility with existing (legacy) decoders which will encounter the modified caption stream. A "safe" method is one which creates no, or little, adverse effects in existing receivers. Embodiments of the present disclosure recognize the advantages of including the location of the SURS in the non-captioning data that can be delivered usefully via that method.

Delivery of the SURS location in Service #6 of the closed caption stream allows the SURS locator to travel within the compressed video packets alongside the regular closed caption data. Thus, whenever a receiver has access to compressed video, it will be able to access the location of the SURS. Thus, in the case where only a partial Transport Stream is available (only the audio and video packets are included in the multiplex) the location of the SURS can still be known.

Use of the DTV caption channel for transport means that no new interfaces or data paths need to be developed in the distribution architecture. Thus, injecting service usage reporting data such as the SURS locator is convenient and offers a low-complexity solution. In cases where the SURS location can be found by processing caption Service #6, the need to derive this data item via a complex interaction with the ACR server is eliminated. Accordingly, in one embodiment, the receiver first attempts to determine the SURS location from a caption service before attempting to determine the SURS location using another method such as via the complex interaction with the ACR server.

Embodiments of the present disclosure utilize the caption data transport to deliver one or a combination of non-closed caption data such as service usage reporting data for those cases in which compressed video is available to the iTV receiver or the caption data transport is otherwise available to the receiver. The service usage reporting data, in some embodiments, includes one or a combination of information identifying a location of a broadcaster's or other entity's service-usage reporting server (SURS), information identifying the broadcaster or other source that originated the associated content, and a content identifier.

In one embodiment, the information identifying the location of the SURS is a URL and the information identifying the originating broadcaster is any one or more of a broadcaster transport signal identifier (TSID), a broadcaster major channel number, and a broadcaster minor channel number. The broadcast TSID is typically unique to a specific broadcast station. The content identifier could correspond to a time stamp or a unique program identifier.

FIG. 1 illustrates an exemplary transmission system 100 for providing service usage reporting data. The transmission system 100 includes a captioning facility 110, production facility 120, and one or more broadcasters such as broadcaster A 160*a* and broadcaster B 160*b*. It is noted that although illustrated as separate entities, any combination of the captioning facility 110, production facility 120, and one or more broadcasters such as broadcaster A 160*a* and broadcaster B 160*b* can be combined into a single facility or entity.

The captioning facility 110 includes a CEA-608/708 caption generator 112. However, the caption generator 112 can be configured to only support one of CEA-608/708 or any other closed caption standard. In one embodiment, the CEA-608/708 caption generator 112 receives closed caption data from a captioner 114. The closed caption data can be entered by a person via a closed caption terminal in real-time or via a speech recognition system. The CEA-608/708 caption generator 112 generates at least one caption data packet (CDP) 116 based on the received closed caption data and provides the CDP 116 to the production facility 120.

The production facility 120 receives the CDP 116 and optionally combines the CDP with interactive content such as a short (compact) trigger 124 using an interactive content generator 122 to generate at least one combined CDP 128. In one embodiment, the interactive content data is provided to the Interactive Content Generator 122 manually, by manual operation via an interactive content terminal by a person, or automatically, via a predetermined schedule provided for the interactive content data.

The CDP 128 is provided to an encoder/multiplexer 130 for encoding and/or multiplexing with content (e.g., a television program or advertisement) associated with the closed caption data contained in the CDP 128. For example, the CDP 128 receives the content from the production unit 132. The production unit 132 receives live content from a studio or pre-authored content from a local or remotely located storage medium. The encoder/multiplexer 130 then provides the CDP 128 and associated content to the broadcaster A 160*a* and broadcaster B 160*b* via a distribution network 134. The distribution network 134 includes one or a combination terrestrial transmission towers, a satellite network, data network such as the Internet, or the like.

In the case of pre-authored content, the CDP 116 is typically created offline. In such a case, the CDP 116 is stored locally at or remotely from the production facility 120. In such a case, the interactive content generator 122 receives the CDP 116 from the local or remote storage device as opposed to the captioning facility 110. Further, in another embodiment, the CDP 128, which includes both the interactive content and the closed caption data are generated offline. In this embodiment, the interactive content generator 122 would retrieve the appropriate CDP 128 to be combined with the associated content by the encoder/multiplexer 130 at the appropriate time.

As illustrated in FIG. 1, in one embodiment, the caption stream derived from incoming content includes one or a combination of the captioning for the content and a short trigger, which has been added by the interactive content generator 122 at the production facility 120. However, the caption stream can include any one or a combination of different information in addition, or as an alternative, to the captioning for the content and/or the short trigger.

Captions flow through the distribution chain as the content is distributed to various network affiliates (e.g., broadcasters). At a given broadcaster (e.g., Broadcaster A 160*a*), the distribution stream is decoded/demultiplexed by a demultiplex/decode unit 162*a* and the CDP 128 is fed to a new function in the station called a non-caption data injection unit 164*a*. The non-caption data injection unit 164*a* is configured to inject non-caption data such as service usage reporting data into the caption stream at random or predetermined time intervals. For example, at Broadcaster A 160*a*, the location of Broadcaster A's SURS is injected into an Adjunct Data service portion of the caption stream as a variable length command in Service #6. Further, in one embodiment, the Major and/or Minor channel number associated with the program is injected into the Adjunct Data service portion of the caption stream. However, other service numbers and/or commands can be used to for the non-closed caption data such as the service usage reporting data, including the SURS location. The modified CDP 166*a* is then multiplexed in by the re-multiplex/re-encode unit 170*a* when the program is re-encoded for transmission via for example transmitter 180*a*. The re-multiplex/re-encode unit 170*a* can also include other content 168*a* such as transport stream information, additional content streams, and the like to be transmitted with the content.

A similar process is performed by Broadcaster B 160*b* using a demultiplex/decode unit 162*b*, non-caption data injection unit 166*b*, re-multiplex/re-encode unit 170*b*, and transmitter 180*b*. Similar to Broadcaster A 160*a*, the Broadcaster B 160*b* could also include other content 168*b* and a modified CDP 166*b* along with the content to be transmitted. It should be noted that the CDP 166*b* and CDP 166*a* each carry a different TSID that is uniquely associated with the original broadcaster.

Note that FIG. 1 is a considerable simplification for purposes of illustration. Often, the distribution is by means of file transfers, and the remultiplexing operation may involve file format conversions or the like. Any content that is being readied for playout can be re-processed to add the SURS locators.

Referring now to FIG. 2, a basic diagram of an information providing apparatus is depicted. In one embodiment, the information providing apparatus is a service provider such as a broadcaster. Generally speaking, a single service provider may provide multiple programs over one or more transport streams. Each of the multiple programs would be associated with the same broadcaster TSID. Accordingly, in some embodiments, additional information such as major and/or minor channel numbers are associated with the program to help distinguish which particular service of the broadcaster was actually consumed. For example, a transport stream can include content programming for both channel 5 and channel 6. The major channel number could be used to distinguish which channel's content programming is actually being consumed by the viewer. The audio, video, and caption data are provided to an encoder which encodes the data into packets suitable for distribution, including caption data packets as described above. As shown, Program A and Program B are encoded by encoders 202 and 204 which are then provided to a transport stream multiplexer 210 which then provides an output that can be distributed via a physical channel medium such as a terrestrial, cable, or satellite broadcast.

This encoded data from the physical channel is received at a reception apparatus (e.g., iTV receiver) as depicted in FIG. 3. In one embodiment, the reception apparatus is a television receiver device (e.g., a television or a set top box). The transport stream is demultiplexed at transport stream demultiplexer 304 to produce one or more program streams including audio, video, and caption data (as well as possibly other data not shown). Video packets from Program A are passed from demultiplexer 304 to video parser 308. Audio packets from Program A are passed from demultiplexer 304 to audio decoder 312 which in turn produces the audio output. Video parser 308 extracts video packets from the video stream and passes them to video decoder 314. Video parser 308 extracts user data from the video stream and passes it to user data parser 310. User data parser 310 extracts closed captioning data from within user data packets and passes it to caption processor 316. Within the caption processor 316, caption service blocks containing data for caption services other than the one of interest are filtered out and discarded.

In one embodiment, the caption processor 316 processes caption service blocks corresponding to the Adjunct Data service whenever service usage reporting data is available or continuously processes the caption service blocks to determine the availability of the service usage reporting data. The caption processor 316 outputs the service usage reporting data to an appropriate component such as the CPU 438, illustrated in FIG. 4. The caption graphics are composited at compositor 320 with the video data.

Figure 4:
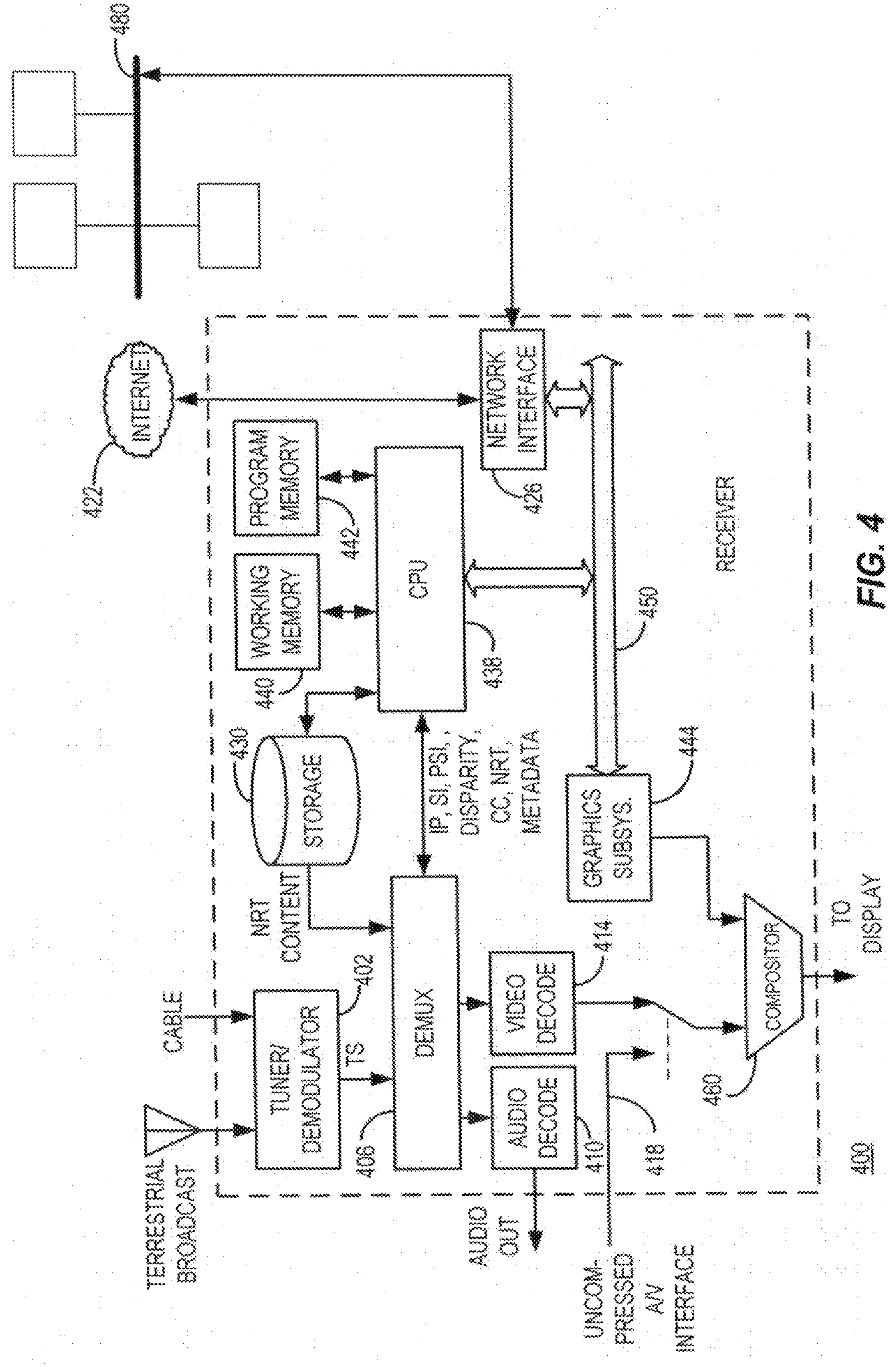
FIG. 4 is an example reception apparatus consistent with certain embodiments of the present disclosure.

A reception apparatus 400 is depicted in greater detail in FIG. 4 wherein content is received via any suitable source such as terrestrial broadcast, cable, or satellite at a reception apparatus 400's tuner/demodulator 402. In one embodiment, the content is received over a home network 480 via, for example, network interface 426. One or more consumer electronic devices (e.g., a set top box) are connected to the home network 480. In one embodiment, the home network 480 is confined to a single household. However, the home network 480 can be extended to cover a larger network such as each unit in an apartment building. The content is received over the home network from, for example, a cable/satellite/IPTV set-top box that supports DLNA protocols and offers a compressed video stream via a network interface. The transport stream from the tuner/demodulator 402 is demultiplexed at demultiplexer 406 into audio and video streams. The audio is decoded at an audio decoder 410 while the video is decoded at a video decoder 414. Uncompressed A/V data may also be received via an uncompressed A/V interface 418 that can be selectively utilized.

A/V content may also be received via the Internet 422 via the network interface 426 for IP television content decoding. In one embodiment, the network interface 426 connects to the Internet 422 using a separate connection from the home network 480. In another embodiment, the network interface 426 connects to the Internet 422 via the home network 480. Additionally, storage 430 can be provided for NRT stored content. The NRT content can be played by demultiplexing by the demultiplexer 406 in a manner similar to that of other sources of content. The reception apparatus 400 generally operates under control of a processor such as CPU 438 which is interconnected to working memory 440 and program memory 442 as well as a graphics subsystem 444 via one or more buses such as 450.

The CPU 438 receives closed caption data from the demultiplexer 406 as well as the service usage reporting data via the mechanism described herein. The closed caption information is passed to the graphics subsystem 444 and the images are composited at the compositor 460 to produce an output suitable for processing and display on a video display. In one embodiment, when the content is received via the network interface 426, the CPU 438 also receives the closed caption data from the network interface 426. In one embodiment, the service report usage data is used by the CPU 438 to report usage information. The usage information is, for example, reported via the network interface 426.

Figure 5:
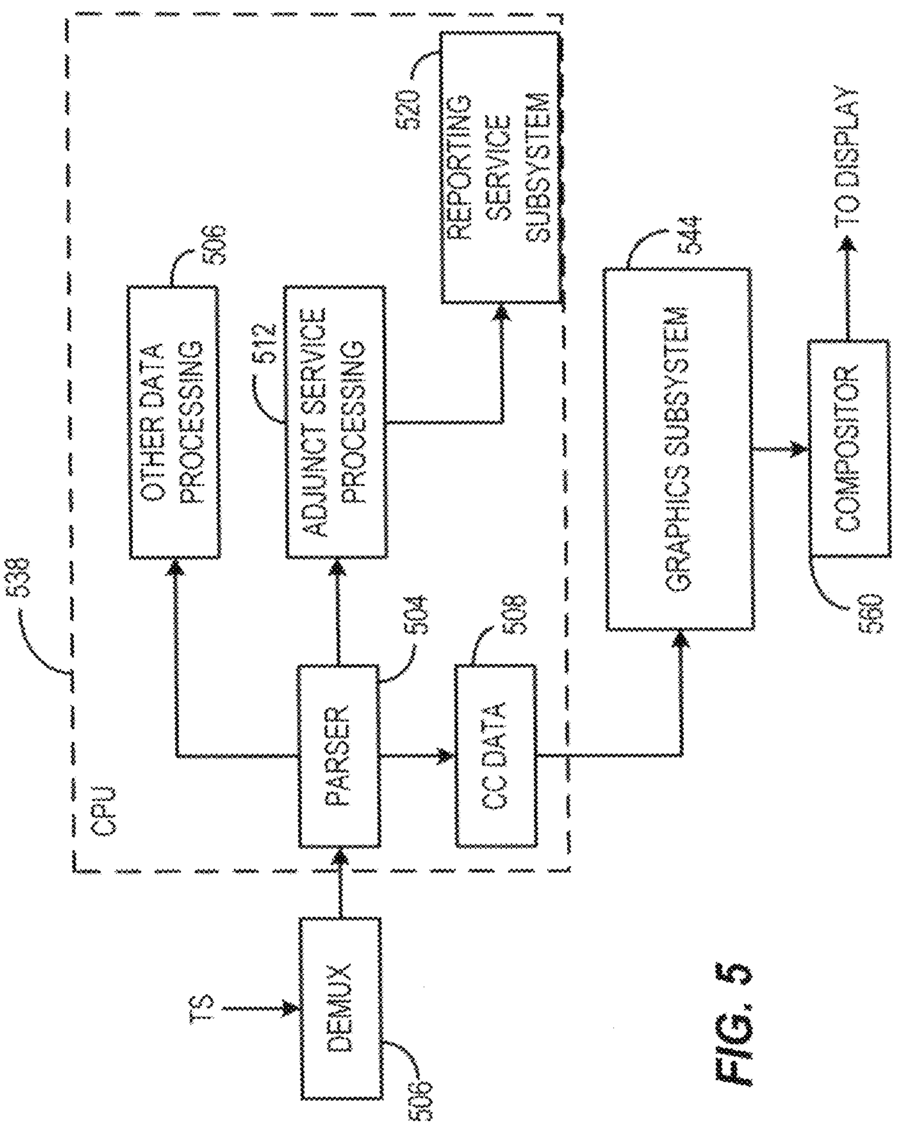
FIG. 5 is an example implementation block diagram of a reception apparatus consistent with certain embodiments of the present disclosure.

Referring now to FIG. 5, an example television receiver system is depicted. In one embodiment, the reception apparatus incorporates the television receiver system. In this system, CPU 538 receives the demultiplexed digital television stream from the demultiplexer 506 containing Standard service numbers within the range of 1-6. A parser 504 parses out the closed caption data and provides it to a closed caption data decoder 508. Further, the parser 504 provides non-closed caption data such as the service usage reporting data to the Adjunct Service processing unit 512. The Adjunct Service processing unit 512 extracts the service usage reporting data and provides the data to a reporting service subsystem 520. The parser 504 also parses other data to be processed by another data processing unit 506. Depending on the embodiment, the reporting service subsystem 520 can be implemented entirely, partially, and independently to/from the CPU 538. The graphics subsystem 544 and compositor 560 are similar to the graphics subsystem 444 and compositor 460 described above.

Figure 6:
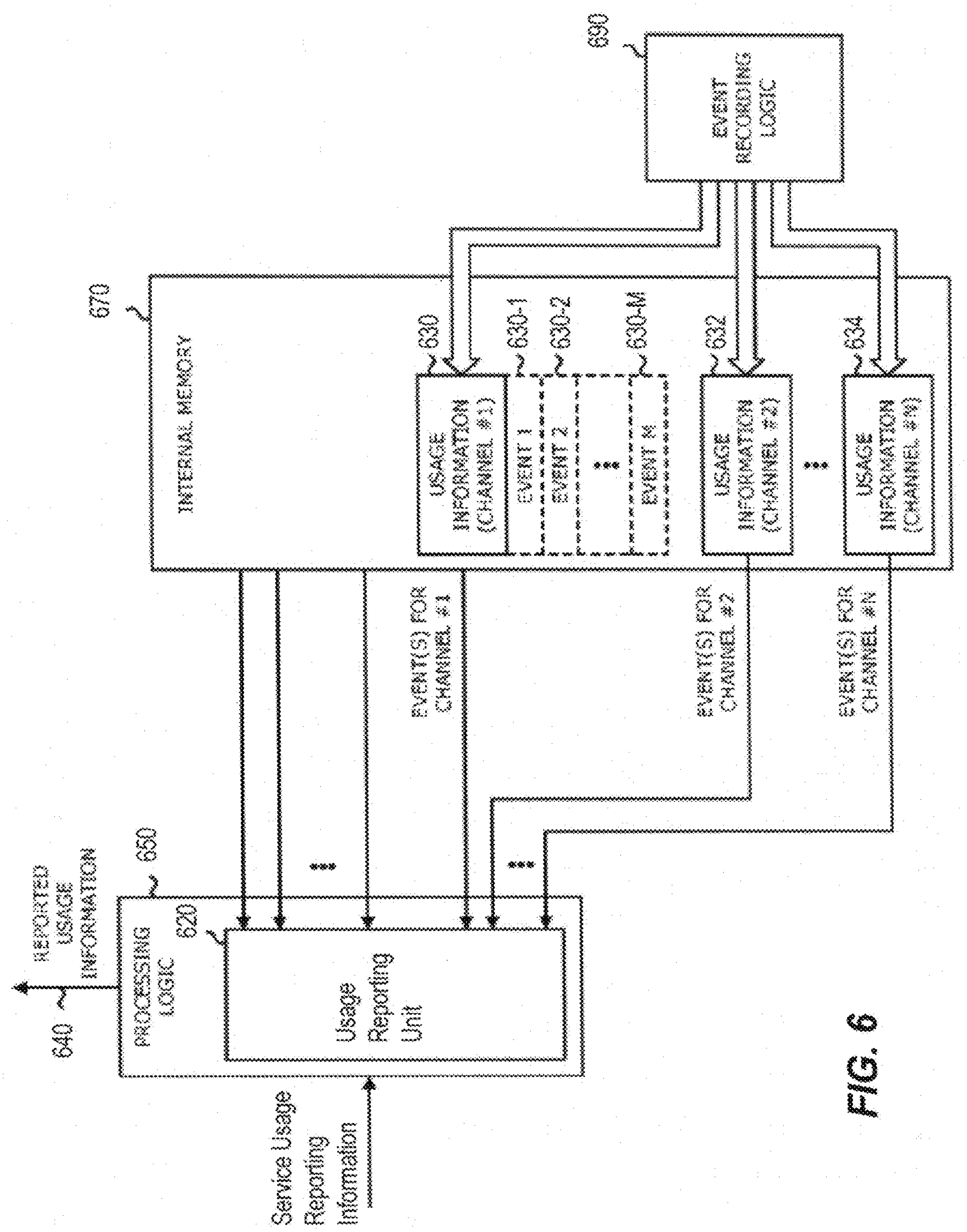
FIG. 6 is an example implementation of a usage reporting subsystem consistent with certain embodiments of the present disclosure.

Referring now to FIG. 6, a block diagram of an exemplary embodiment of the reporting service subsystem 520 is shown. In one embodiment, the reporting service subsystem 520 operates in concert with an event recording logic 690 for the reporting of usage of advanced services. In one embodiment, the event recording logic is a built-in television, set top box, or other consumer electronics device function and is programmed to collect usage records on events such as the time tuned to a station, time tuned away from the station, whether a viewer chose to download NRT content, whether the viewer played the NRT content, deleting of the NRT content, and other linear TV and NRT usage. Herein, processing logic 650 comprises a usage reporting unit 620. Upon the television receiver system tuning to channel 1, the event recording logic 690 records information associated with the usage of advanced services as content is transmitted via channel 1. Such usage information describes one or more events that were detected by the event recording logic 690 and stored accordingly in internal memory 670.

More specifically, during execution, the event recording logic 690 detects a storage location of usage information 630 associated with channel 1 (service provider). This storage location may be identified by either (i) a unique filename associated with selected channel (or service provider) or (ii) a specific address reserved for usage information associated with the channel (or service provider). Thereafter, the usage reporting unit 620 is adapted to recover usage information 630 from "M" event log files 630-1 through 630-M and transmit the same over a network connection 640 to a SURS designated in the service usage reporting data associated with channel 1.

Thereafter, upon the television receiver system tuning to channel 2, the event recording logic records information associated with the usage of advanced services while tuned to channel 2. Such usage information 632 is extracted from event log files associated with events detected by event recording logic 690. In one embodiment, the events recorded by the event recording logic 690 can be recorded along with event usage information recorded by one or more triggered declarative objects as described in U.S. Patent Application Publication No. 2011/0243536, filed Jan. 5, 2011, to Mark Eyer.

The usage reporting unit 620 detects a storage location (e.g., file, address, etc.) of usage information 632 associated with channel 2 (or service provider). Thereafter, the usage reporting unit 620 is adapted to recover usage information 632 and route the same over network connection 640 to an SERS designated in the service usage reporting data associated with channel 2. Similar processes apply to usage information 634.

A TDO is a downloadable software object created by a content provider, content creator, or service provider, which includes declarative content (e.g., text, graphics, descriptive markup, scripts, and/or audio) whose function is tied in some way to the content it accompanies. An embodiment of the TDO is described in U.S. application Ser. No. 12/959,529 filed Dec. 3, 2010 entitled "Announcement of Triggered Declarative Objects" to Blanchard et al. which is hereby incorporated by reference in its entirety. However, the TDO is not limited to the structure described in Blanchard et al. since many attributes defined therein as being a part of a TDO could be situated in a trigger or vice versa or not present at all depending upon the function and triggering of a particular TDO.

The TDO is generally considered as "declarative" content to distinguish it from "executable" content such as a Java applet or an application that runs on an operating system platform. Although the TDO is usually considered to be a declarative object, a TDO player supports a scripting language that is an object-oriented programming language. The TDOs are typically received from a content or service provider in advance of the time they are executed, so that the TDO is available when needed. Moreover, an explicit trigger signal may not be necessary and a TDO may be self-triggering or triggered by some action other than receipt of a trigger signal. Various standards bodies may define associated behaviors, appearances, trigger actions, and transport methods for content and metadata for a TDO. Additionally, requirements regarding timing accuracy of TDO behaviors relative to audio/video may be defined by standards bodies.

Figure 7A:
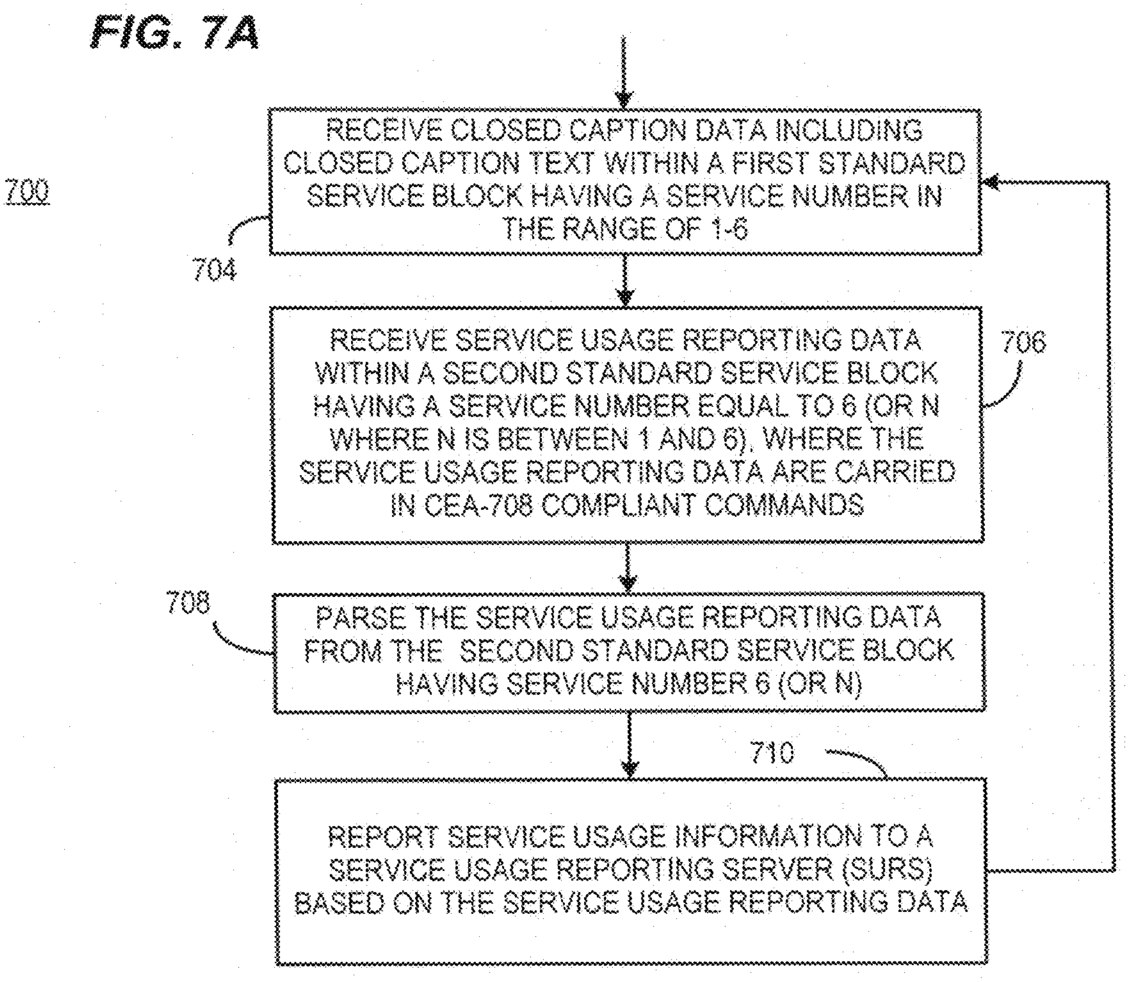
FIG. 7A is an example flow chart of a process consistent with certain embodiments of the present disclosure.

Referring now to FIG. 7A, an example method of processing service usage reporting data is depicted in flow chart 700. In one embodiment, the processing is performed by a reception apparatus. The process begins at step 704 where closed caption data including closed caption text is received within a first Standard service block having a service number in the range of 1-6. At step 706, service usage reporting data is received within a second Standard service block having a service number equal to 6. In one embodiment, the reception apparatus receives closed caption service data that includes both the closed caption data and the non-closed caption data. For example, the closed caption service data may be provided to the reception apparatus in a closed caption transport stream.

In general, the Standard service used for the service usage reporting data could be any of service numbers n between 1 and 6, but since it is relatively rare for more than the first few of the service numbers to be used for caption data, service number 6 is preferred. Further, in some embodiments, service usage reporting data is transported in a Standard service block having a service number in the range of 1-6 (e.g., service number 6), alongside actual closed caption data. In one embodiment, the reception apparatus distinguishes between the closed caption data and the service reporting usage service data by means of command codes, as described above.

At step 708, the reception apparatus parses (e.g., in a parsing computer process module) the service reporting usage data from the second standard service block having a service number 6 (or n). The reception apparatus stores the service reporting usage data in a memory and reports and generates usage information based on the stored data. In one embodiment, the service usage reporting data include parameters that identify the type of usage information to be reported to the SURS, the timing of the usage reporting, or the like.

The service reporting usage data is then processed at step 710 (e.g., in another processor operation) to perform usage reporting based on the parsed service reporting usage data.

Figure 7B:
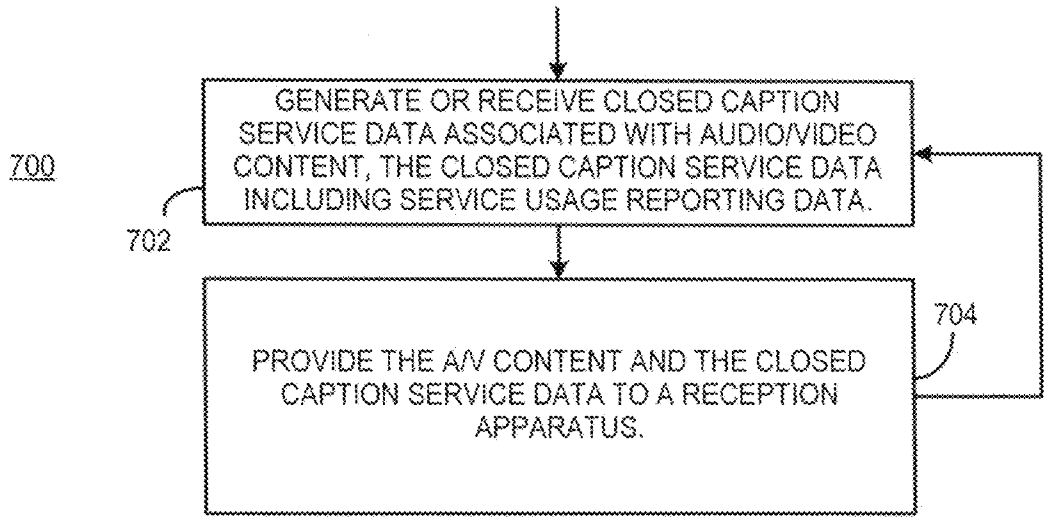
FIG. 7B is an example flow chart of a process consistent with certain embodiments of the present disclosure.

FIG. 7B illustrates an exemplary method 700 of providing service usage reporting data. In one embodiment, the method is performed by an information providing apparatus associated with, for example, broadcaster A 160*a* to provide the service usage reporting data to a reception apparatus. The process begins at step 702 at which time the information providing apparatus generates or receives closed caption service data associated with content to be provided to the reception apparatus. In step 704, the information providing apparatus provides the content (e.g., A/V content) and closed caption service data to the reception apparatus. The closed caption service data, in one embodiment, includes closed caption data and service usage reporting data and/or other non-closed caption data. The closed caption data defines closed caption text associated with the content.

FIGS. 8A-8I illustrate examples of the commands used to transport service usage reporting data (also referred to as reporting service data), in the closed caption stream. In one embodiment, the service usage reporting data includes a SURS Locator, which is a variable-length command delivered in the C3 code set as defined in CEA-708. An exemplary format of the SURS Locator is as follows:

<domain_name>/<name/directory space>?<optional parameters>.

In the exemplary format, domain_name refers to the domain name registered to the broadcaster originating the associated content or another entity designated to receive a service usage report. The name/directory space is managed by the domain owner and identifies a server/directory where the service usage report is to be stored. The optional parameters identify any additional information associated with the service usage reporting services such as a content identifier. Examples of the SURS Locator are as follows:

broadcasterA.tv/7a1; and broadcasterA.tv?7a1"content_id=529.

Other optional parameters could include a type that is interpreted by the SURS. Such a parameter could control what the SURS will do with the service usage report. For example, the SURS could perform a different function based on who is reporting the service usage information. In another example, a service usage report for a program that aired on Tuesday at 8 pm could be processed differently than a program watched at 2 pm on the next day, even if the URL of the SURS remains the same.

Further, in one embodiment, a different SURS could be designated for different content. For example, a location of the SURS of the broadcaster could be provided along with a television program, while a location of the SURS of one or more advertisers is provided along with advertisements. Other parameters include validity, timing of reporting, and the like.

As specified in CEA-708-D Section 7.1.11.2, variable-length commands are indicated by the EXT1 character followed by a number in the range 0x90 to 0x9F, where the "0x" notation denotes a number represented in hexadecimal format. In the command formats depicted in FIG. 8A, the EXT1 character (0x10) is followed by 0x99. In this context, 0x99 is the command identifier for the SURSLocator command. In accordance with the syntax defined in CEA-708-D Section 7.1.11.2, the next byte contains a two-bit Type field, a zero bit, followed by a 5-bit length field as illustrated in FIG. 8B, for example.

The SURS_locator( ) data structure follows the byte containing the length field. The syntax of one example of the SURS locator data is depicted in pseudocode in the table illustrated in FIG. 8C. In FIG. 8C, locator_type is a 4-bit unsigned integer that shall indicate the type of locator to follow. In one embodiment, only type 0 locators are defined. Further, the value of locator type is set to 0 in one embodiment. Receivers are expected to disregard instances of the SURSLocator command indicating locators of any other (unrecognized) type. Further, URL_character is an 8-bit ASCII character whose value is restricted to those allowed for Uniform Resource Identifiers (URIs) by RFC 2396. In one embodiment, the character string formed by the URL delivered in the SURS_locator shall be a valid URI per RFC 2396.

Further, there are a variety of other ways the variable-length SURS URL can be delivered in Service #6, although in each case, a CEA-708 variable-length command would typically be used. This command is in the C3 code space and is identified by a command code sequence of EXT1 (code value 0x10) followed by a number in the range 0x90 to 0x9F. Of course, another service number, code set (e.g., if a fixed-length SURS URL or representation is used), or code can be used to deliver the SURS URL.

In one embodiment the SURS URL is delivered in the same command that was proposed for the iTV Trigger in U.S. Provisional Application No. 61/613,869, by using a value other than zero for the type (e.g., trigger_type). For example, using that command code (EXT1-0x98), a value of 1 for type could indicate the included URL is a SURS locator.

In some embodiments, the EXT1+0x90-9F command sequence is used for the "variable-length" command. In other embodiments, other multi-byte (i.e., not variable-length) commands can be used as well, for example in service number 6. It should be noted that any of the command codes that are not defined in CEA-708 (set aside for expansion) are usable in service number 6 or any other service numbers.

FIG. 8D illustrates an embodiment in which the service usage reporting data includes a Broadcaster TSID, which is command delivered in the C0 code set as defined in CEA-708. The Broadcaster TSID command, in this embodiment, is a three-byte code, which contains a command code followed by two data bytes as illustrated in FIG. 8E, for example. As specified in CEA-708-D Section 7.1.4, the C0 code set contains 32 addressable codes from 0x00 to 0x1F. Of these addressable codes, unused codes from 0x18 to 0x1F are of a fixed-length having three bytes. In one embodiment, any one of these unused codes (e.g., 0x19) is used to convey the broadcast TSID.

FIG. 8F illustrates an embodiment in which the service usage reporting data includes a broadcaster major channel number, which is a command delivered in the C0 code set as defined in CEA-708. The broadcaster major channel number, in this embodiment, is a three-byte code, which contains a command code followed by two data byes as illustrated in FIG. 8G, for example.

As specified in CEA-708-D Section 7.1.4, the C0 code set contains 32 addressable codes from 0x00 to 0x1F. Of these addressable codes, unused codes from 0x18 to 0x1F are of a fixed-length having three bytes. In one embodiment, any one of these unused codes (e.g., 0x1A) is used to convey the broadcast TSID.

FIG. 8H illustrates an embodiment in which the service usage reporting data includes a broadcaster minor channel number, which is a command delivered in the C0 code set as defined in CEA-708. The broadcaster minor channel number, in this embodiment, is a three-byte code, which contains a command code followed by two data byes as illustrated in FIG. 8I, for example.

As specified in CEA-708-D Section 7.1.4, the C0 code set contains 32 addressable codes from 0x00 to 0x1F. Of these addressable codes, unused codes from 0x18 to 0x1F are of a fixed-length having three bytes. In one embodiment, any one of these unused codes (e.g., 0x1B) is used to convey the broadcast TSID.

Figure 9:
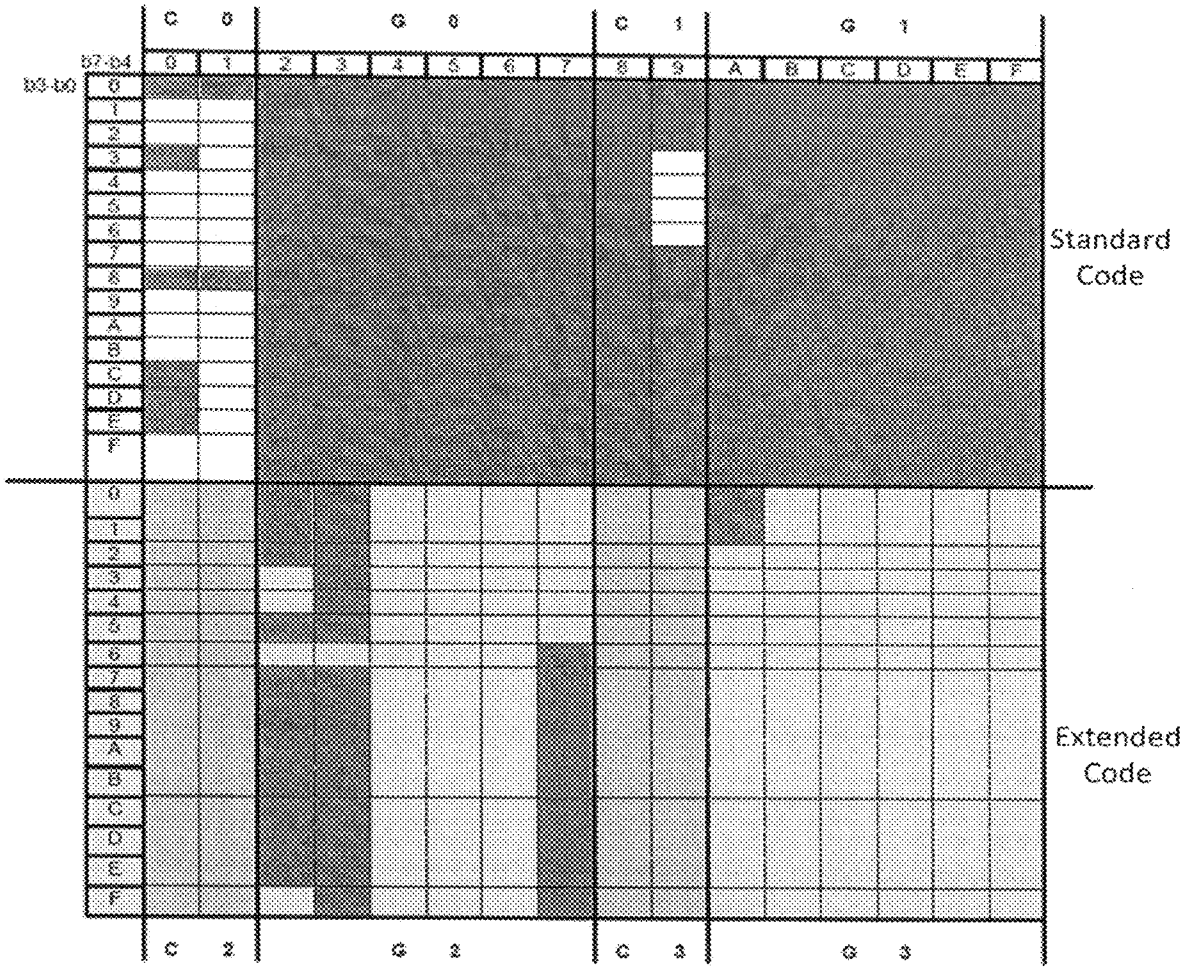
FIG. 9 is an example of available codes in a DTVCC Code Set Mapping in accordance with CEA-708-D that can be used in certain embodiments of the present disclosure.

Although, each of the exemplary service usage reporting data is described as being included using certain code sets and codes specified in the CEA-708-D and variable- or fixed-length commands, it should be noted that the identified codes sets and codes are exemplary only. Specifically, any unused codes sets or codes can be used to convey any one or more of the service usage reporting data, as illustrated in FIG. 9 for example. Further, in other embodiments, variable- or fixed-length commands can be used for any of the service usage reporting data. Moreover, a plurality of the service usage reporting data can be conveyed using the same code set and code.

Figure 10:
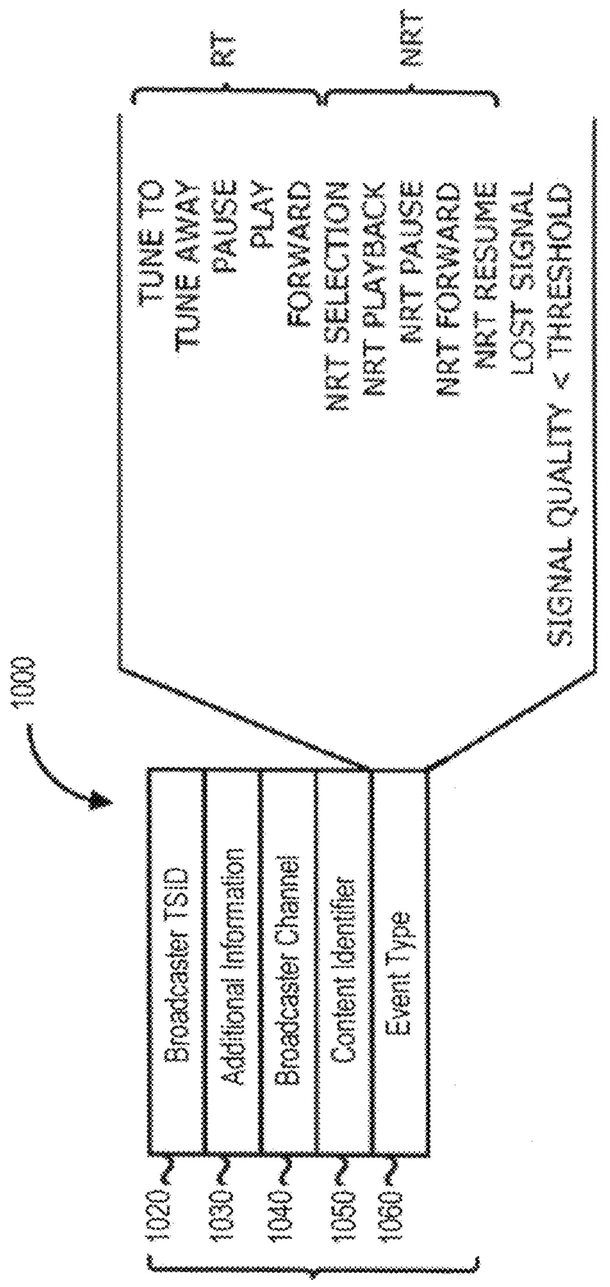
FIG. 10 is an example of an event log file consistent with certain embodiments of the present disclosure.

Referring to FIG. 10, a block diagram of an exemplary embodiment of an event log file 1000 (e.g., log file 630-1) that comprises a plurality of attributes is shown. Herein, according to one embodiment, event log file 1000 includes one or a combination of a broadcaster transport stream ID attribute 1020, an additional information attribute 1030 (e.g., timing information), a broadcaster channel number attribute 1040 (e.g., major and/or minor channel numbers), a content identifier attribute 1050, and one or more event type attributes 1060 along with optional event information that may provide additional information concerning the particular event type.

The broadcaster transport stream ID attribute 1020 is used to identify the originating broadcaster of the content being played back during the detected event. In one embodiment, the broadcaster transport stream ID attribute 1020 is populated according to the broadcaster TSID carried in the closed caption stream, as described above.

The additional information attribute 1030 can be configured to include any other information of interest to the broadcaster or another entity. In one embodiment, the additional information attribute 1030 includes an indication of whether the content was received via a rebroadcast. For example, the additional information attribute 1030 could store the TSID of a received broadcast and/or channel number on which the content is received. The broadcaster or other entity could determine whether the content was received via a rebroadcast based on a comparison of whether the TSID and/or channel numbers match that of the originator of the content. Alternatively, the determination can be made at the receiver and the result of the determination included in the additional information attribute 1030.

Further, the additional information attribute 1030 can include timing attribute is used to provide timing as to when the event occurred. For instance, timing attribute may provide a date, and time of day (hour, minute, second). According to another embodiment of the present disclosure, timing attribute 1030 may provide a relative time from a start time of playback of the content. For instance, for an event that occurs at 14:15:06 during a broadcast of a thirty (30) minute program starting at 14:00:00, timing attribute 430 may be a value representing 00:15:06.

The broadcaster channel number attribute 1040 identifies the major and/or minor channel associated with the content being played back at the time of the event. In one embodiment, the channel number attribute 1040 is populated according to the broadcaster major and/or minor channels carried in the closed caption stream, as described above.

The content identifier attribute 1050 identifies the content being received by the reception apparatus at the time the event occurs. In one embodiment, the content identifier attribute 1050 is populated with a content identifier carried in the closed caption stream, as described above. In another embodiment, the content identifier can be obtained by providing a sample of the received content to an automatic content recognition (ACR) system via, for example, the Internet. The ACR system analyzes the sample provided by the reception apparatus and provides the associated content identifier to the reception apparatus.

As shown in detail in FIG. 10, event type attribute 1060 identifies the event represented by event log file 1000. There are multiple types of events that may be detected and reported back to the service provider. For instance, the events may include, but are not limited or restricted to the following operations performed by electronic device:

1) Type-1: Tuned to the channel in question;
2) Type-2: Tuned away from the channel in question;
3) Type-3: Paused playback of the real-time content;
4) Type-4: Continued playback of the real-time content;
5) Type-5: Fast-forward the real-time content;
6) Type-6: Selection of NRT content;
7) Type-7: Playback of the NRT content;
8) Type-8: Paused playback of the NRT content;
9) Type-9: Fast-forward of the NRT content;
10) Type-10: Continued playback of the NRT content;
11) Type-11: Loss of downloaded content that may be used for comparison with other end users in the same vicinity to determine equipment performance issues—equipment that needs repair or adjustment to address signal strength (or lack of signal) issues; and
12) Type-12: Reduction of signal quality below preset threshold to also determine equipment performance issues specific to the end user.

According with event log file 1000 illustrated in FIG. 10, timing and event type attributes 1030 and 1060 may collectively identify a time at which an end user tuned to a channel associated with event log file 1000. Similarly, timing and event type attributes 1030 and 1060 may collectively identify a time at which an end user tuned away from the prescribed channel or conducted user display controls (pause, resume, playback, and forward) of content being downloaded when the event occurred. In one embodiment, the files are tagged and placed in separate directories for each broadcaster. Further, the event log file 1000, in one embodiment, can be used to report whether a viewer watched all three advertisements during a commercial break and the specific product advertised. Such a determination can be made for example, based on the service usage reporting data by determining whether the SURS identifier with a content id is received for each one of the advertisements. In such a case, the frequency of transmission of the service usage reporting data is determined based on the level of usage detail required by the broadcaster or advertiser.

As described above, the CEA standard for advanced captioning, CEA-708, included a number of provisions intended to allow future extensions to the standard to be made. Using one of these extensions for the addition of service reporting data would seem to be a logical choice, however implementations of CEA-708 caption decoders have been found to be deficient with respect to the way they handle some of these extensions. The CEA-708 standard has been found to be unclear or confusing in some areas, a fact that contributes to implementation errors or omissions.

Certain embodiments of the present disclosure minimize the possibility that legacy decoders are adversely affected by the presence of service usage reporting data in the captioning stream. As described above, a method described herein involves delivering the service usage reporting data within a separate caption service that is known to be associated with one of the Standard caption services.

The CEA-708 advanced captioning standard supports multiple simultaneous caption services so that, for example, captioning in different languages can be offered for the same program. CEA-708 defines a "minimum decoder" in Section 9. A minimum decoder is required to process the "Standard" service numbers 1 through 6. Processing "Extended" services 7 through 63 is optional. Quoting from CEA-708, "Decoders shall be capable of decoding all Caption Channel Block Headers consisting of Standard Service Headers, Extended Service Block Headers, and Null Block headers."

One of the non-closed caption data transport methods described herein involves placing one or a combination of non-closed caption data such as service usage reporting data in an "Adjunct Data" service. In this approach Standard Service Number 6 is recognized as the Adjunct Data service according to the preferred implementation. Service 6 may therefore carry data that is used by the receiver to render caption Services 1 thorough 5, as well as Service 6.

A system could be designed where caption service 6 (or some other Standard service number in the 1-6 range) could carry one or a combination of non-closed caption data. Within Standard Service #6, for example, signaling can be present to associate a certain block of non-closed caption data with a particular one of the Standard services (1-6), when necessary. In real world situations it is rare for more than one or two of the Standard service numbers (usually services 1, 2 and perhaps rarely 3) to be used. Hence, although seemingly awkward and inefficient, in real world applications, this turns out not to be the case. However, there remains the theoretical issue of compatibility with all legacy receiver devices.

An additional aspect involves the method where the data structure used to transport the non-closed caption data uses an extensibility feature of CEA-708 called the "variable-length" command as defined in CEA-708-D, which is incorporated by reference in its entirety, at Sec. 7.1.11.2. Such a method is not recognized to be suitable for use within the context of most Standard services because it is believed that a significant population of legacy receivers exist that are not able to handle this feature. Such receivers would likely display garbled caption output on-screen if they would encounter one of these Variable Length Commands. However, if the service usage reporting data is delivered in a Standard Service #6 service block, this is not a problem unless a case arises in which all six Standard Services are in use simultaneously. In current practice, it is rare that even two simultaneous caption services are used. Programs captioned in both English and Spanish are somewhat rare, but do occur. Programs captioned in more than two simultaneous languages are seldom if ever produced. Therefore, placing a variable-length command in Service #6 is not disruptive to current and most contemplated caption services delivery.

It is believed that all existing receivers are able to properly skip service blocks corresponding to service numbers they are not currently decoding. Furthermore, proper handling in the receiver of Standard caption services 1-6 is required by FCC rules. If any legacy receiver attempts to decode non-closed caption such as service usage reporting data (which should not normally occur, as caption services containing non-closed caption data are not announced in the Caption Service Descriptor), if the receiver is built according to CEA-708-D, it will simply disregard the contents of the command.

Thus, certain embodiments of the present disclosure also address, for example:

1. The need for a delivery method for service usage reporting data that is compatible with legacy devices (e.g., does not produce anomalous output when they are processing the caption data for a 2D version of the broadcast).

2. Delivering service usage reporting data in an Extended Service (a caption service in the "extended" range 7-63) is a possibility, but may not represent the safest solution for helping to assure legacy compatibility due to the extra byte in the service block.

3. Service usage reporting data in Standard Service #6 could possibly be decoded by a legacy decoder (if the user were to select Service #6 in a menu). In this case, the legacy device, if built compliant to CEA-708-D, would decode correctly—it should simply discard the non-closed caption data as an unsupported command.

To optimize compatibility with legacy decoders (while not being able to absolutely guarantee that all legacy decoders would be able to properly disregard the new command), the Variable Length Command as defined in CEA-708-D Sec. 7.1.11.2 is used. Such commands use the "C3" command ("C3 Code Set—Extended Control Code Set 2"). If properly implemented, legacy decoders should skip variable length commands further assuring that they will not take an unpredictable action.

Hence, in order to help assure that legacy decoders will not malfunction due to attempting to process service usage reporting data, Standard Service #6 (in the example preferred implementation) is used to transport the service usage reporting data. To further prevent legacy decoders from attempting to render the services, variable- and fixed-length commands can be used to define the service usage reporting data in any suitable manner. While some legacy decoders may not properly implement the "skip variable length extensions" feature as defined in CEA-708, viewers may not be given an option to choose Standard Service #6 anyway since it is an "unannounced" service. Unless all six Standard Services actually carry caption services (a situation that is currently believed to be extremely rare if in existence at all), Service #6 will not be announced in the Caption Service Descriptor (CSD) defined in ATSC A/65 Program and System Information Protocol (PSIP), which is incorporated by reference in its entirety.

The methods described herein overcome potential problems such as those present with alternative delivery and transport methods. Certain embodiments of the present disclosure use a Standard service for transport since using a Standard service for transport is likely to be the safest possible way to ensure legacy compatibility.

In accordance with this approach, Standard service #6 (or another Standard service number n=any of services 1 through 6) is defined as the Adjunct Data service. Characteristics of the Adjunct Data service include:

1. Formatted as a Variable Length command (see CEA-708-D Section 7.1.11.2 Variable Length Codes from 0x90 to 0x9F) or Fixed Length command so that properly designed receivers will discard the contents of the packets.

2. Not announced in the PSIP Caption Service Descriptor (thus properly designed receivers will not announce and offer the service containing Adjunct Data to the user).

3. Includes non-closed caption data such as service usage reporting data for Standard Services #1 through #6.

Further, certain embodiments of the present disclosure overcome, for example, the following potential problems:

1. All legacy receivers may not be designed to properly disregard Extended service packets. This is because the data structure for the CEA-708-D Service Block (see Table 9 in CEA-708-D) includes one extra byte when the service_number field='111' (decimal 7). Therefore use of the Extended services may be potentially be problematic. The present subject matter places Adjunct Data in Standard service packets. All legacy decoders should be able to handle the presence of Standard service packets and are able to filter out packets corresponding to services they are not set to decode (non-selected services).

2. Some legacy receivers may not use the PSIP Caption Service Descriptor (CSD) to create the user interface for selection of caption services. In this case, it could be possible for the user to select caption Service #6 (the Adjunct Data channel) and attempt to decode it. The proposed method uses a "variable-length" and/or "fixed-length" command which would be unknown to the receiver. Receivers are expected to discard unsupported commands, thus they should be able to skip the proper number of bytes in order to discard the command. In this case, nothing would be displayed for Service #6.

Even in the case that something were to be displayed (garbage characters or whatever), the user would decide this is not a good caption service and would choose a better one. Hence, no harm would be done.

The present disclosure contains references to CEA-708 and CEA-708-D. Disclosures referring to CEA-708, without the revision letter, relate to the CEA-708 standard generally and not to details that are included, or not included, by a particular revision of the standard. Further, disclosures referring to a particular version of the CEA-708 standard (e.g., CEA-708-D) are expected to apply to other revisions (e.g., successor revisions) of the standard.

Those skilled in the art will recognize, upon consideration of the above teachings, that certain of the above exemplary embodiments are based upon use of a programmed processor. However, embodiments of the present disclosure are not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present disclosure. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present disclosure, that the processes described above can be implemented in any number of variations and in many suitable programming languages without departing from embodiments of the present disclosure. For example, the order of certain operations carried out can often be varied, additional operations can be added or operations can be deleted without departing from certain embodiments of the disclosure. Error trapping can be added and/or enhanced and variations can be made in operational flow, user interface and information presentation without departing from certain embodiments of the present disclosure. Such variations are contemplated and considered equivalent.

While certain illustrative embodiments have been described, it is evident that many alternatives, modifications, permutations and variations will become apparent to those skilled in the art in light of the foregoing description.

The invention claimed is:

1. A reception apparatus, comprising:

circuitry configured to receive a broadcast stream including audio/video content and a uniform resource identifier (URI) from a broadcaster, determine that the URI is a location of a service-usage reporting server associated with the broadcaster to which service usage information is to be sent based on a type indicator associated with the URI, when the type indicator indicates the URI is the location of the service-usage reporting server to which the service usage information is to be sent, associate the URI with the service-usage reporting server, and provide the service usage information to the service-usage reporting server according to the associated URI.

2. The reception apparatus according to claim 1, wherein the URI corresponds to a uniform resource locator (URL) of the service-usage reporting server.

3. The reception apparatus according to claim 1, wherein the circuitry includes a television tuner that is configured to receive the broadcast stream from the broadcaster via a terrestrial broadcast.

4. The reception apparatus according to claim 1, wherein the broadcast stream includes a plurality of URIs that indicate different service-usage reporting server locations to which the service usage information is to be sent.

5. The reception apparatus according to claim 4, wherein the circuitry is configured to provide first service usage information for a first audio/video content to a first service-usage reporting server associated with a first one of the plurality of URIs, and provide second service usage information for a second audio/video content to a second service-usage reporting server associated with a second one of the plurality of URIs.

6. The reception apparatus according to claim 1, wherein the service usage information includes a content identifier.

7. A method for providing service usage information, the method comprising:

receiving, by circuitry of a reception apparatus, a broadcast stream including audio/video content and a uniform resource identifier (URI) from a broadcaster;

determining that the URI is a location of a service-usage reporting server associated with the broadcaster to which service usage information is to be sent based on a type indicator associated with the URI;

when the type indicator indicates the URI is the location of the service-usage reporting server to which the service usage information is to be sent, associating by the circuitry the URI with the service-usage reporting server; and providing, by the circuitry, the service-usage information to the service-usage reporting server according to the associated URI.

8. The method according to claim 7, wherein the URI corresponds to a uniform resource locator (URL) of the service-usage reporting server.

9. The method according to claim 7, wherein the receiving comprises:

receiving, by a television tuner of the circuitry, the broadcast stream from the broadcaster via a terrestrial broadcast.

10. The method according to claim 7, wherein the broadcast stream includes a plurality of URIs that indicate different service-usage reporting server locations to which the service usage information is to be sent.

11. The method according to claim 10, wherein the circuitry is configured to provide first service usage information for a first audio/video content to a first service-usage reporting server associated with a first one of the plurality of URIs, and provide second service usage information for a second audio/video content to a second service-usage reporting server associated with a second one of the plurality of URIs.

12. The method according to claim 7, wherein the service usage information includes a content identifier.

13. A non-transitory computer-readable medium storing instructions which when executed by a computer cause the computer to perform a method for providing service usage information, the method comprising:

receiving a broadcast stream including audio/video content and a uniform resource identifier (URI) from a broadcaster;

determining that the URI is a location of a service-usage reporting server associated with the broadcaster to which service usage information is to be sent based on a type indicator associated with the URI;

when the type indicator indicates the URI is the location of the service-usage reporting server to which the service usage information is to be sent, associating the URI with the service-usage reporting server; and providing the service-usage information to the service-usage reporting server according to the associated URI.

14. The non-transitory computer-readable medium according to claim 13, wherein the URI corresponds to a uniform resource locator (URL) of the service-usage reporting server.

15. The non-transitory computer-readable medium according to claim 13, wherein the receiving comprises:

receiving, by a television tuner of the circuitry, the broadcast stream from the broadcaster via a terrestrial broadcast.

16. The non-transitory computer-readable medium according to claim 13, wherein the broadcast stream includes a plurality of URIs that indicate different service-usage reporting server locations to which the service usage information is to be sent.

17. The non-transitory computer-readable medium according to claim 16, wherein the circuitry is configured to provide first service usage information for a first audio/video content to a first service-usage reporting server associated with a first one of the plurality of URIs, and provide second service usage information for a second audio/video content to a service-usage reporting second server associated with a second one of the plurality of URIs.

18. The non-transitory computer-readable medium according to claim 13, wherein the service usage information includes a content identifier.

19. The reception apparatus according to claim 1, wherein the type indicator is an 8-bit unsigned integer.

20. The reception apparatus according to claim 1, wherein the broadcast stream includes one or a combination of a transport signal identifier (TSID), a major channel number, and a minor channel number of the broadcaster.

* * * * *